US009633657B2

(12) United States Patent
Svendsen et al.

(10) Patent No.: US 9,633,657 B2
(45) Date of Patent: Apr. 25, 2017

(54) SYSTEMS AND METHODS FOR SUPPORTING HEARING IMPAIRED USERS

(71) Applicant: SPEAKREAD A/S, Kongens Lyngby (DK)

(72) Inventors: Niels Svendsen, Dragoer (DK); Dmitry Sergeev, Vinnitsa (UA)

(73) Assignee: SPEAKREAD A/S, Dragoer (DK)

( * ) Notice: Subject to any disclaimer, the term of this patent is extended or adjusted under 35 U.S.C. 154(b) by 0 days.

(21) Appl. No.: 14/677,236

(22) Filed: Apr. 2, 2015

(65) Prior Publication Data
US 2015/0287408 A1 Oct. 8, 2015

Related U.S. Application Data

(60) Provisional application No. 61/973,887, filed on Apr. 2, 2014.

(51) Int. Cl.
G10L 15/00 (2013.01)
G10L 15/26 (2006.01)
G10L 15/18 (2013.01)
G10L 15/30 (2013.01)
G10L 15/01 (2013.01)
G10L 21/06 (2013.01)
G10L 15/22 (2006.01)

(52) U.S. Cl.
CPC .............. G10L 15/26 (2013.01); G10L 15/18 (2013.01); G10L 15/30 (2013.01); G10L 15/00 (2013.01); G10L 15/01 (2013.01); G10L 2015/225 (2013.01); G10L 2021/065 (2013.01)

(58) Field of Classification Search
CPC ......... G10L 15/00; G10L 15/01; G10L 15/22; G10L 15/32; G10L 15/063; G10L 2015/225; G10L 2021/065
See application file for complete search history.

(56) References Cited

U.S. PATENT DOCUMENTS

| 6,542,200 | B1* | 4/2003 | Barcy | H04N 5/44513 348/468 |
| 6,785,650 | B2* | 8/2004 | Basson | G10L 15/22 704/235 |
| 7,565,282 | B2* | 7/2009 | Carus | G10L 15/063 704/251 |
| 8,364,481 | B2* | 1/2013 | Strope | G10L 15/32 704/231 |
| 8,682,659 | B2* | 3/2014 | Kristjansson | G10L 21/0208 704/226 |
| 9,135,912 | B1* | 9/2015 | Strope | G10L 15/063 |
| 2004/0024601 | A1* | 2/2004 | Gopinath | G10L 15/22 704/270 |
| 2007/0005206 | A1* | 1/2007 | Zhang | G06F 3/16 701/36 |

(Continued)

Primary Examiner — Richard Zhu
(74) Attorney, Agent, or Firm — Norton Rose Fulbright Canada LLP

(57) ABSTRACT

A method for providing speech recognition to a user on a mobile device are provided, the method comprising: 1) receiving, by a processor, audio data; 2) processing the audio data, by a speech recognition engine, to determine one or more corresponding text, wherein the processing comprises querying a local language model and a local acoustic model; and 3) displaying the one or more corresponding text on a screen of the mobile device.

20 Claims, 7 Drawing Sheets

(56) References Cited

U.S. PATENT DOCUMENTS

| | | | |
|---|---|---|---|
| 2007/0112571 A1* | 5/2007 | Thirugnana | H04M 1/274516 704/270 |
| 2013/0044130 A1* | 2/2013 | Geisner | G09G 5/00 345/633 |
| 2013/0304457 A1* | 11/2013 | Kang | G10L 13/00 704/201 |
| 2015/0036856 A1* | 2/2015 | Pruthi | G06F 3/04842 381/317 |
| 2015/0149169 A1* | 5/2015 | Chang | G10L 15/26 704/235 |

* cited by examiner

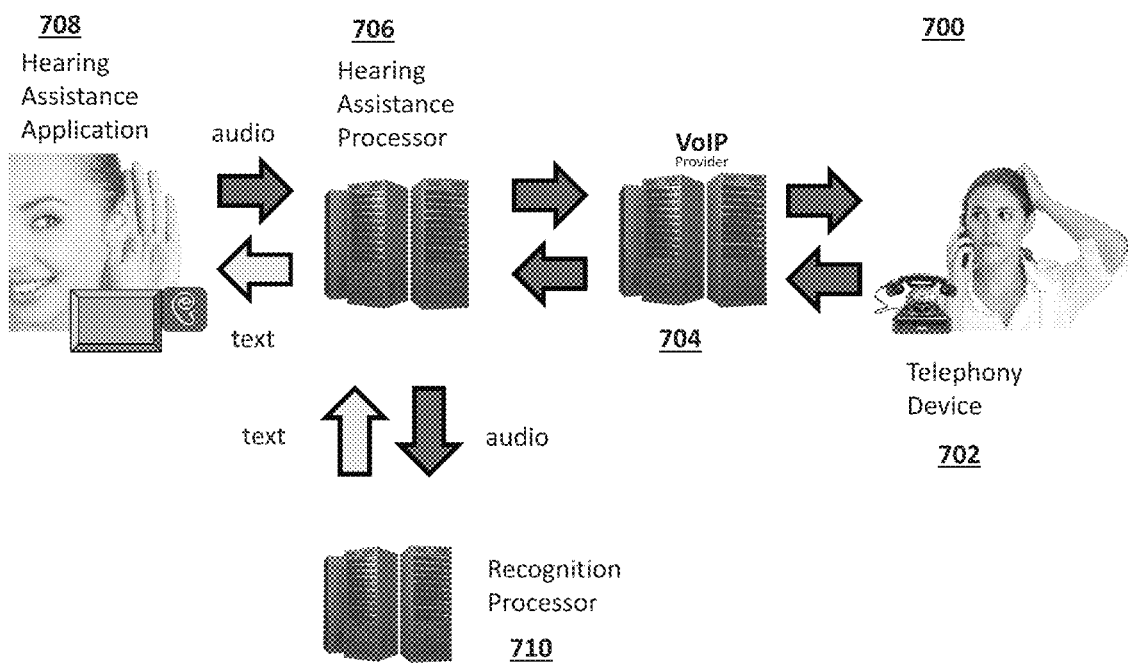

SYSTEMS AND METHODS FOR SUPPORTING HEARING IMPAIRED USERS

FIELD

Embodiments described herein relate generally to speech recognition systems. In particular, embodiments described herein relate to systems and methods of speech recognition for hearing impaired individuals.

INTRODUCTION

People who are hearing impaired may lose their ability to communicate verbally in an easy manner. They may require a fast-typing human interpreter for meetings and other functions alike. Electronic and compact solutions are desired.

For the hearing impaired population to be able to leverage speech recognition systems, additional functionalities may be needed which consider that the hearing impaired may not be able to hear his or her own speech without a hearing aid.

For example, a hearing impaired individual may not realize that background noise may be interfering with the efficiency and accuracy of a speech recognition system. For another example, a hearing impaired individual may not know that he or she is speaking at a volume too low for the microphone to pick up the audio signal properly. Current speech recognition solutions may not give feedback as to why the speech recognition system is not working properly or not working accurately. A user that is hearing impaired may not be able to hear their own speech to determine if he or she is speaking at a low volume or is at a place that has a high level background noise.

In yet another example, the hearing impaired individual may not be aware of his or her own accents, especially for those whose English is not their first language, and thus would likely appreciate feedback from a speech recognition system where high or low recognition rate occurs for a particular phrase or word.

SUMMARY

In an aspect, embodiments described herein provide a system for speech recognition for a hearing impaired user on a mobile device. The system has a hearing assistance processor configured for real-time data exchange with a hearing assistance application, at least one voice processor and at least one recognition processor.

The at least one voice processor configured to receive audio data from a telephony device for transmission to the mobile device. The hearing assistance processor configured to continuously receive or intercept in real-time or near real-time the audio data from the voice processor and continuously transmit the audio data in real-time or near real-time to the at least one recognition processor to convert the audio data into corresponding text data. The hearing assistance processor configured to continuously receive the text data from the recognition processor and transmit the text data to the hearing assistance application in real-time or near real-time.

The system has a hearing assistance application on a mobile device having a display screen. The hearing assistance application configured to continuously receive the text data and display at least a portion of the text data on the display screen of the mobile device in real-time or near real-time.

In accordance with embodiments, operation of the system does not require specific configuration of the telephony device for providing the speech recognition to the user of the mobile device.

In some embodiments, the hearing assistance application is configured to receive additional audio data for transmission to the telephony device and transmit the additional audio data to the hearing assistance processor. The hearing assistance processor is configured to transmit the additional audio data to the telephony device via the at least one voice processor.

In some embodiments, the hearing assistance processor is configured to process the audio data by querying a local language model and a local acoustic model.

In some embodiments, the hearing assistance processor is configured to train the local language model and the local acoustic model based on data from the global database or user input.

In some embodiments, the hearing assistance processor is configured to interact with the at least one recognition processor to determine if the audio data is clear or otherwise of sufficient quality to be processed by the at least one recognition processor, and upon determining that the audio data is not clear or of insufficient quality to be processed, sending feedback to the telephony device and prompting for improved audio data.

In some embodiments, the hearing assistance processor is configured to determine, for the audio data, a recognition index as an estimation of accuracy and switch to connect to at least one other recognition processor in attempt to improve the recognition index.

In some embodiments, the hearing assistance processor is configured to determine, for the audio data, a recognition index as an estimation of accuracy and switch to at least one other voice processor in attempt to improve the recognition index.

In some embodiments, the hearing assistance processor is configured to derive metadata or parameters for the audio data and determine, for the audio data, a recognition index as an estimation of accuracy using the metadata or the parameters.

In some embodiments, the hearing assistance processor is configured to identify a user providing the audio data and transmit the identity of the user to the at least one recognition processor to improve accuracy of recognition.

In some embodiments, the hearing assistance application is configured to receive additional audio data and transmit the additional audio data to the hearing assistance processor. The hearing assistance processor is configured to transmit the additional audio data to the at least one recognition processor to convert the additional audio data into corresponding additional text data, receive the additional text data from the at least one recognition processor, and transmit the additional text data to the hearing assistance application. The hearing assistance application configured to display at least a portion of the additional text data on the display screen of the mobile device and receive confirmation to transmit the additional audio data or the text data to the telephony device, and transmit the confirmation to the hearing assistance processor. The hearing assistance processor is configured to, in response to receiving the confirmation, transmit the additional audio data or the text data to the telephony device via the at least one voice processor.

In some embodiments, the hearing assistance processor is configured to derive metadata or parameters for the audio data and determine, for the audio data, a recognition index as an estimation of accuracy using the metadata or the parameters.

In some embodiments, the hearing assistance processor is configured to compare the recognition index to a threshold and transmit a feedback notification to the hearing assistance application for display on the display screen of the mobile device.

In another aspect, there is provided a system of providing speech recognition to a hearing impaired user on a mobile device. The system may have a hearing assistance application on a mobile device, the mobile device having a display screen, the hearing assistance application configured to receive audio data and transmit the audio data. The system may have a hearing assistance processor configured for real-time data exchange with the hearing assistance application, at least one voice processor and at least one recognition processor. The hearing assistance processor is configured to receive the audio data from the hearing assistance application and transmit the audio data to the at least one recognition processor to convert the audio data into corresponding text data, receive the text data from the at least one recognition processor, and transmit the text data to the hearing assistance application.

The hearing assistance application is configured to display at least a portion of the text data on the display screen of the mobile device and receive confirmation to transmit the audio data, the text data or additional audio data derived from the text data to the telephony device, and transmit the confirmation to the hearing assistance processor. The hearing assistance processor is configured to, in response to receiving the confirmation, transmit the audio data, the text data, or the additional audio data derived from the text data to the telephony device via the at least one voice processor.

The hearing assistance application is configured to receive additional audio data for transmission to the telephony device and transmit the additional audio data to the hearing assistance processor. The hearing assistance processor is configured to transmit, to the hearing assistance application, additional text data corresponding to the additional audio data, and in response to receiving an additional confirmation, transmit the additional audio data to the telephony device via the at least one voice processor.

In some embodiments, the hearing assistance processor is configured to process the audio data by querying a local language model and a local acoustic model.

In some embodiments, the hearing assistance processor is configured to train the local language model and the local acoustic model based on data from the global database or user input.

In some embodiments, the hearing assistance processor is configured to interact with the at least one recognition processor to determine if the audio data is clear or otherwise of sufficient quality to be processed by the at least one recognition processor, and upon determining that the audio data is not clear or of insufficient quality to be processed, sending feedback to the telephony device and prompting for improved audio data.

In some embodiments, the hearing assistance processor is configured to determine, for the audio data, a recognition index as an estimation of accuracy and switch to connect to at least one other recognition processor or at least one other voice processor in attempt to improve the recognition index.

In some embodiments, the hearing assistance processor is configured to identify a user providing the audio data and transmit the identity of the user to the at least one recognition processor to improve accuracy of recognition.

In another aspect, there is provided a method of providing speech recognition to a hearing impaired user on a mobile device. The method may involve continuously receiving, at a hearing assistance processor in real time or near real time, audio data from a hearing assistance application; continuously transforming the audio data, by a speech recognition processing in real time or near real time, into corresponding text data, wherein the processing comprises querying a local language model and a local acoustic model; receiving metadata and parameters about the environment and background of the audio data to determine a recognition index, modifying the continuous transformation of the audio data into corresponding text data based on the recognition index; and continuously transmitting the text data to the hearing assistance application in real time or near real time for display of at least a portion of the one or more corresponding text on a screen of the mobile device.

In accordance with another aspect, there is provided a method for speech recognition on a mobile device. The method may involve receiving, by a processor, audio data; processing the audio data, by a speech recognition engine, to determine one or more corresponding text, wherein the processing comprises querying a local language model and a local acoustic model; and displaying the one or more corresponding text on a screen of the mobile device.

In accordance with another aspect, the method further comprises the step of determining if audio data is clear or otherwise of sufficient quality to be processed by speech recognition engine, and where audio data is not clear or of insufficient quality to be processed, sending feedback to the user and prompting the user to speak again.

In accordance with another aspect, the method may involve determining if audio data is clear or otherwise of sufficient quality comprises determining a recognition index.

In accordance with yet another aspect, the method may further involve the step of checking a global database or asking for user input if a word cannot be recognized based on the audio data.

In accordance with still another aspect, the method may further comprises training the local language model and the local acoustic model based on data from the global database or the user input.

Further example embodiments are described herein.

BRIEF DESCRIPTION OF THE DRAWINGS

In the drawings, embodiments are illustrated by way of example. It is to be expressly understood that the description and drawings are only for the purpose of illustration and as an aid to understanding, and are not intended as a definition of the limits.

FIG. 7 illustrates an example system diagram according to some embodiments.

DETAILED DESCRIPTION

Figure 1:
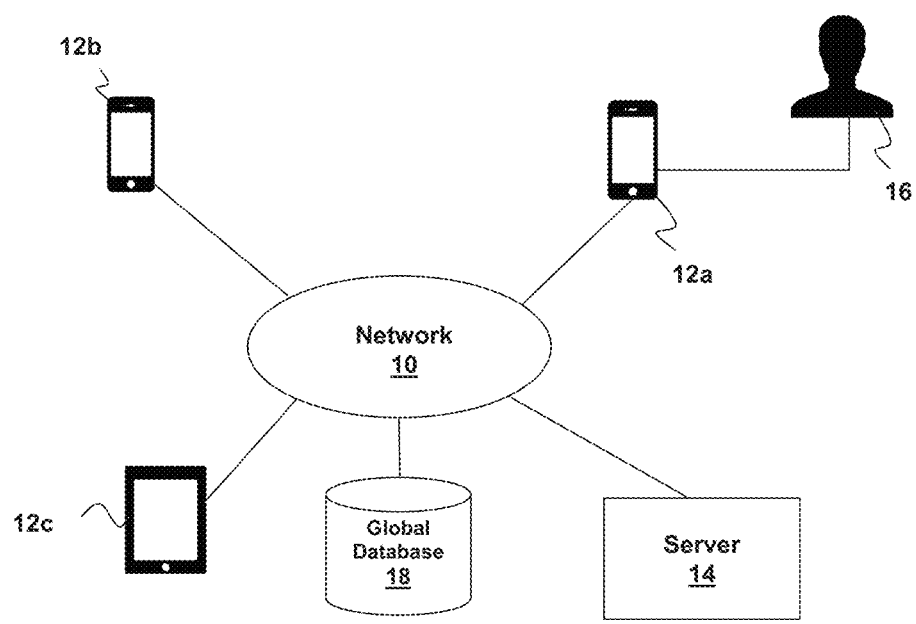
FIG. 1 illustrates an exemplary system network diagram according to some embodiments.

Features of the systems, devices, and methods described herein may be used in various combinations, and may also be used for the system and non-transitory computer-readable storage medium in various combinations.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements are combined, the communication interface may be a software communication interface, such as those for inter-process communication. In still other embodiments, there may be a combination of communication interfaces implemented as hardware, software, and combination thereof.

Each program may be implemented in a high level procedural or object oriented programming or scripting language, or a combination thereof, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. One should appreciate that the systems and methods described herein may transform electronic signals of various data objects into three dimensional representations for display on a tangible screen configured for three dimensional displays. One should appreciate that the systems and methods described herein involve interconnected networks of hardware devices configured to receive data using receivers, transmit data using transmitters, and transform electronic data signals for various three dimensional enhancements using particularly configured processors, where the three dimensional enhancements are for subsequent display on three dimensional adapted display screens.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Disclosed herein is a system, comprising at least one mobile application installed on a mobile device 12 and optionally a server or processor 14, that can be configured to take audio input from a microphone (not shown) of the mobile device 12 and displays one or more lines of corresponding text based on speech recognition technology. The mobile application may be referred to herein as a hearing assistance application. The server 14 may be referred to herein as a hearing assistance processor. The server 14 may also provide speech/text recognition functionality and voice over Internet Protocol (VoIP) functionality. The server 14 may be implemented using connected processors configured according to the embodiments described herein. The server 14 may connect to third party services for data exchange.

Referring now to FIG. 1, an exemplary system network diagram is shown. Network 10 may be one or more networks in any suitable form, including as a local area network or a wide area network, such as an enterprise network or the Internet. Such networks may be based on any suitable technology and may operate according to any suitable protocol and may include wireless networks, wired networks or fiber optic networks.

It is to be appreciated that even though a mobile device such as a phone may be illustrated in the drawings and referred to in the description, they may also be substituted with any type of computing device capable of providing the functionalities described herein. For example, a mobile phone may also be a tablet device or a handheld gaming device, and vice versa configured to receive voice, speech or audio data from an input device such as a microphone. The user 16 may be a hearing impaired individual or healthy individual with no hearing difficulties for speech recognition functionality.

Mobile phones 12a, 12b (e.g. iPhone™ or Samsung™ smartphone) or another type of computing device 12c such as iPad™ (collectively referred to as mobile devices) can each provide a user 16 access to a SpeakRead mobile application that may be configured to operate in both offline and online models. In one exemplary embodiment, mobile devices 12 may be installed with an operating system, such as the Apple™ iOS systems. In another embodiment, mobile devices 12 may be installed additional or alternative operating systems such as Android™ or BlackBerry™ operating systems, for example.

SpeakRead mobile application and mobile device 12 may be implemented using particularly configured hardware and software to interact with server 14 via network 10 to implement the functionalities described herein. As shown in FIG. 1, the system may include one or more mobile devices 12 operable by users to access remote network resources. The system may be implemented using one or more processors and one or more data storage devices configured with database(s) or file system(s), or using multiple devices or groups of storage devices distributed over a wide geographic area and connected via a network (which may be referred to as "cloud services").

SpeakRead mobile application and server 14 may reside on any networked computing device, such as a personal computer, workstation, server, portable computer, mobile device, personal digital assistant, laptop, tablet, smart phone, WAP phone, an interactive television, video display terminals, gaming consoles, electronic reading device, and portable electronic devices or a combination of these.

In an offline model, mobile devices 12 may not need to connect to network 10 or access server 14 in order to deliver speech recognition capacities and associated functionalities to user 16. Offline model may also be activated by user 16 where the user 16 wishes to use an offline model of the SpeakRead mobile application even if mobile device 12 is connected to a network 10, or a network connection is temporarily unavailable.

Server 14 may include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Server 14 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each of server 14 and mobile device 12 may include one or more input devices, such as a keyboard, mouse, camera, touch screen, sensors, and a microphone, and may also include one or more output devices such as a display screen (with three dimensional capabilities) and a speaker. Mobile device 12 and server 14 may each has a network interface in order to communicate with other components, to access and connect to network resources, to serve an application and other applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Mobile device 12, SpeakRead mobile application and server 14 can be operable to register and authenticate users (using a login, unique identifier, and password for example) prior to providing access to applications, a local network, network resources, other networks and network security devices. In addition, server 14 may serve one user or multiple users.

Mobile device 12 and server 14 can work in an inter-cooperative manner to exchange data and enable user 16 to see recognized text on a display screen corresponding to speech input to mobile device 12. That is, modules from mobile device 12 and modules from server 14 may cooperate and communicate as required to execute functions as described herein. In addition, SpeakRead mobile application can analyze a variety of data and generate intelligence to create and inform recommendations for user 16 based on his or her speech input.

Server 14 can be further configured to provide a client portal interface, which a user 16 or others may access to provide vocabulary data or other kinds of speech recognition data based on user historical usage of SpeakRead mobile application. The client portal interface may be a web-based interface and hosted by cloud or at server 14.

Figure 6:
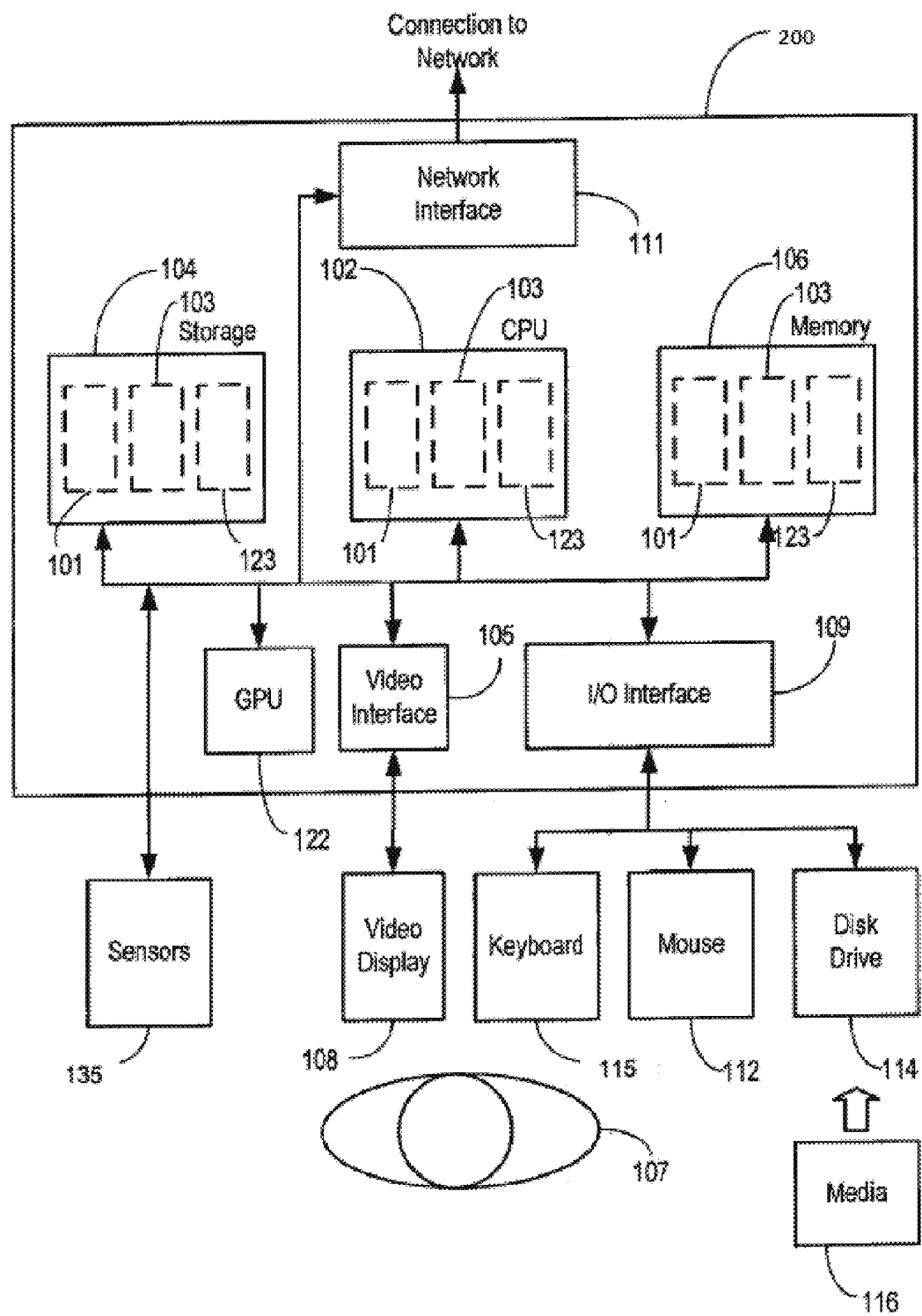
FIG. 6 illustrates an exemplary computer device that may be used as a server platform or processor according to some embodiments.

In one embodiment, server 14 may be implemented by a computer server system 200 which hardware elements described in relation to FIG. 6.

In another embodiment, server 14 may be implemented as a cloud service, a cluster service or simply a cluster hosted in cloud, or a router server configured based on certain configurations.

A global vocabulary database 18 may be provided by the system in order to enhance the speech recognition capability of SpeakRead system. For example, the database may comprise a large number of recorded utterances from different speakers with a variety of dialects, accents, and tones. The database may be global in the sense that it can include over tens of thousands or more of utterances from a large number of talkers from different speech recognition systems all over the world. Both server 14 and mobile devices 12 may access this global vocabulary database 18 via network 10.

In one embodiment, global database 18 comprises a worldwide proprietary, licensable database holding multi-language, multi-dialect and multi-jargon voice-text words and relations with a unique, anonymous voice signature or voice identification for each user 16. As described, server 14 may improve accuracy of recognition by identifying a user and using voice recognition techniques custom, tailored or narrowed for the specific user and corresponding user type. For example, a user may have a particular accent and the server 14 may be trained using historical data regarding the user to recognize text from speech with the particular accent. As an additional example, a user may provide feedback, correction and verification which may train server 14 to improve accuracy for a particular user.

Figure 2:
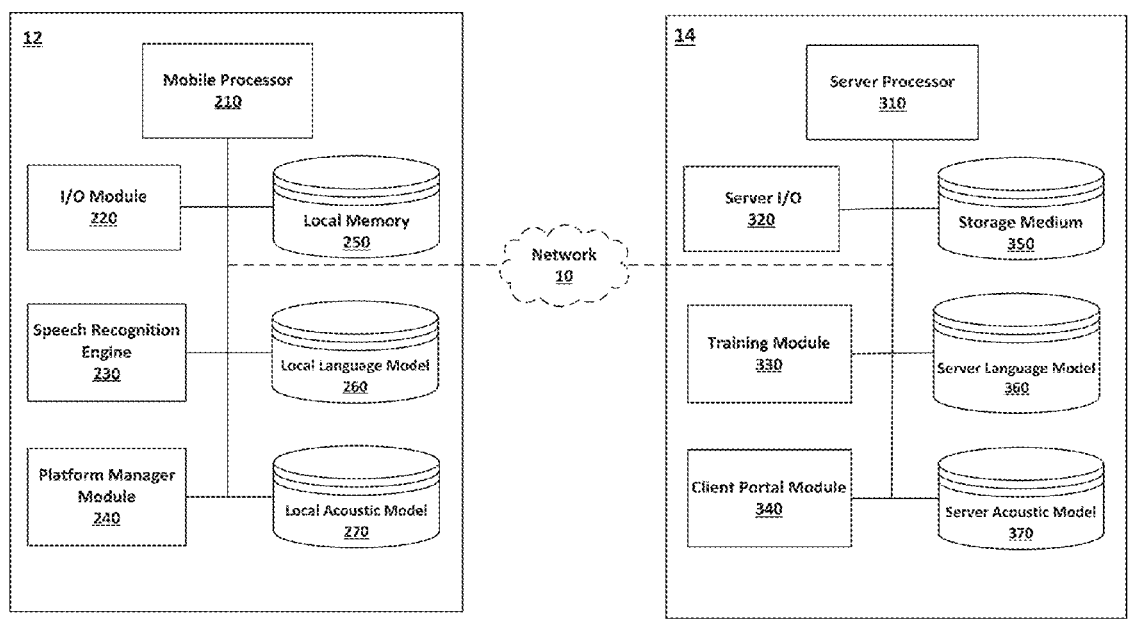
FIG. 2 illustrates an exemplary system diagram of a mobile device and a server according to some embodiments.

FIG. 2 illustrates an exemplary system diagram of a mobile device and a server in accordance with an aspect of embodiments described herein. In one embodiment, SpeakRead mobile application can be installed on mobile device 12 and, if needed, connect to server 14 via network 10. In one embodiment, mobile device 12 can comprise a mobile processor 210, an I/O module 220 connected to at least an microphone and a screen (not shown), a speech recognition engine 230, a platform manager 240, a local memory 250, a local language model 260 and a local acoustic model 270. In another embodiment, mobile device 12 may optionally comprise a lexicon database (not shown).

Mobile Device 12 and Speakread Mobile Application

Mobile device 12 and SpeakRead mobile application can be configured to receive speech or audio input from a user 16 via I/O module 220 and to store the received audio in analog and/or digital form in an electronic database, either in a local memory 250 or in a remotely connected database. The audio input may be processed by speech recognition engine 230, which in conjunction with platform manager 240, local language model 260 and local acoustic model 270 can recognize the speech by user 16 and display the recognized text on mobile device 12. A detailed workflow is described elsewhere in accordance with FIG. 5.

In one embodiment, speech recognition engine 230 may be speech recognition engine suitable for installation on mobile device 12. For example, it may be PocketSphinx. For another example, it may be a speech recognition engine compatible with various speech recognition frameworks such as OpenEar™ or RapidEar™. Speech recognition engine 230 can work in a cooperative manner with local language model 260 and local acoustic model 270 to recognize a speech input by user 16. Speech recognition engine 230 may comprise at least a speech decoder. In one embodiment, a speech decoder may be a component or module that can recognize text, through a decoding process, based on a digital audio file as well as various other input such as a language model, an acoustic model, and so on. In some embodiments, the speech recognition engine 230 may include multiple speech processors to switch between or compare results to improve accuracy of recognition.

Local language model 260 can be a statistical or probabilistic model that contains large list of words and corresponding probability of occurrence for each word in the list. The local language model 260 may be created from training based on a speech corpus, which can be a database of audio files and corresponding text transcripts. In one embodiment, the local language model 260 may comprise only text. In the same or another embodiment, the local language model 260 may comprise a grammar file containing sets of predefined combinations of words. In addition, the local language model 260 can be trained to recognize the grammar and patterns of user 16's speech, for example via Background Language Model Training Module (BLMT) 410, described below.

Local acoustic model 270 can be a file that comprises statistical representations of each phoneme or distinct sound that may be present in a word. For example, the English language may be associated with approximately 40 different phonemes. Each phoneme in the acoustic model may be linked to or comprise one or more statistic representations that may be generated by Hidden Markov Models (HMMs). An acoustic model may also be created by training based on a speech corpus. In one embodiment, the local acoustic model 270 can be trained to recognize the characteristics of user 16's speech patterns and tones.

In another embodiment, local language model 260 and/or local acoustic model 270 may be part of speech recognition engine 230.

Figure 4:
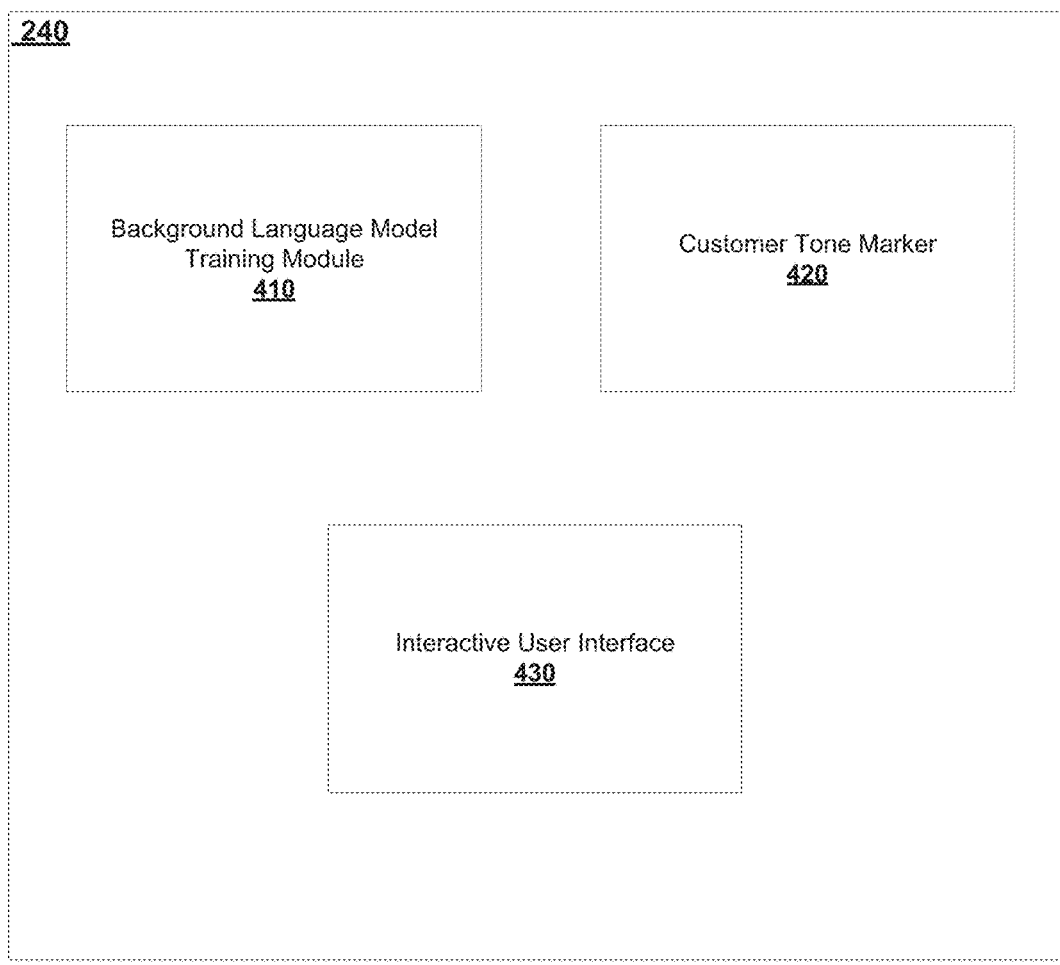
FIG. 4 illustrates an exemplary block diagram of a platform manager according to some embodiments.

Referring now to FIG. 4, an exemplary block diagram of a platform manager 240 in accordance with one aspect is shown. A platform manager 240 may comprise Background Language Model Training Module (BLMT) 410, Customer Tone Marker (CTM) 420 and Interactive User Interface (IUI) 430.

BLMT 410 can be configured to track a recognition index for all phrases that a user 16 utters and received by mobile device 12. A recognition index can be determined for each word, sentence, and/or text utterance by user 16. The recognition index can be an estimation of the likelihood an associated word or sentence is accurately recognized. The recognition index can be a score of accuracy for the recognition. The recognition index may be a metric based on different factors or metadata or parameters for audio data such as clarity of audio data, presence of background noise, historical data, and so on. In one embodiment, BLMT 410 can be configured to generate a recognition index for each word, sentence, and/or text recognized by the speech recognition engine 230 based on real-time or near real-time data from user input. In another embodiment, a recognition index can be generated only after receiving user input. For example, if a user input is not received by the mobile device 12 after a recognized text is displayed on the screen of mobile device 12, and no corrections are made to the recognized text, the recognition index may update, such as to be 100%, assuming that the user is satisfied with the recognized text.

In one embodiment, after recognised text of a user's 16 speech is displayed on the screen of the mobile device 12, the user 16 may indicate to the mobile device 12 that he or she would like to edit the displayed recognized text. The user 16 may indicate such an intention by single or double tapping the screen of the mobile device 12, or he or she may edit the words or sentence via voice commands to the mobile device 12 (e.g. "incorrect" or "edit sentence").

Once the mobile device 12 receives indication that the user 16 intends to edit the most recently recognized text displayed on the screen, the mobile device 12 via Interface User Interface (IUI) 430 may provide the user 16 with an interface on which the user 16 may enter his desired edits. For example, if the recognized text displayed is "wake me up at 11 am" after the user actually said "wanna meet up at 11 am", the user 16 may choose to edit "wake me" to "wanna meet." Once the user 16 has finished the edits, he or she may hit enter key, and IUI 430 on the mobile device 12 may store and/or send the user input "wanna meet" as well as the replaced text "wake me" to BLMT 410. BLMT 410 may then generate a recognition index based on the user input and the original recognized text. For another example, if a user corrects 1 word out of 10 words in a sentence, the recognition index may be 9 out of 10 or 90%. In another example, if a user corrects all the words in a sentence, the recognition index may be 0%. Once generated, the recognition index can be stored in a temporary memory cache or a local memory 270.

In another embodiment, the user 16 would only correct a displayed word if the word or the associated sentence does not make much sense to the user 16.

BLMT 410 may be configured to adapt classic training or machine learning techniques such as Bayesian analysis, Hidden Markov Models, Baum Welch algorithm, decision tree and so on, in training data and updating local language and acoustic models 260 and 270.

In one embodiment, a recognition index may be on a scale of 1 to 10, where 1 may represent lowest likelihood of being accurately recognized (or highest likelihood of containing a recognition error); and 10 represents the highest likelihood of being accurately recognized. In another embodiment, a recognition index may be in a form of probability (e.g. 70% likely to be accurately recognized). For each registered user 16 of SpeakRead mobile application, a recognition index may be generated for each word, sentence and/or text spoken by the user 16, and stored in relation to a user ID and/or a voice signature of the user 16. In another embodiment, a recognition index can be generated only after receiving user input. For example, if a user input is not received by the mobile device 12 after a recognized text is displayed on the screen of mobile device 12, then there is no corrections made to the recognized text, in which case the recognition index can be determined to be 100%, assuming that the user is satisfied with the recognized text.

In one embodiment, BLMT 410 can be configured to send words, phrases and/or sentences with high recognition index to server 14. Server 14 may then train the server language and acoustic models and/or vocabulary databases based on the words sent by BLMT 410. Server 14 may further periodically or continuously send updated language and acoustic models to the all mobile devices 12, which may in turn help with increasing the recognition rate for all words received by mobile device 12.

In another embodiment, BLMT 410 of platform manager 240 can be configured to send all recognized words, phrases and/or sentences to server 14, along with the associated recognition index for each word or sentence.

CTM 420 can be configured to identify a user by his or her unique accents, patterns, tones, and/or other sound characteristics in his speech. CTM 420 may further be configured to generate and store a voice signature (VS) of a user 16 based on his or her unique accents, patterns, tones, and/or other sound characteristics of audio input received by mobile device 12. CTM 420 can record the unique accents, tones, and/or other sound characteristics in a database (e.g. local memory 250) and associate them to the voice signature stored. Each voice signature may be linked to a corresponding user ID as well. Therefore, by comparing and possibly matching the sound characteristics of the audio input with a voice signature associated with a user ID, the system can determine if a person speaking at any given moment is registered user 16 or a new speaker. In one embodiment, dedicated personal vocabularies may be built for each user 16 registered with each mobile device 12, and optionally also for each new speaker.

IUI 430 can be configured to send suitable recommendations via text to user 16 in the event a recognition index is low. Platform manager 240 can track various parameters of speech or words such as recognition index, noise level, volume and so on. As described elsewhere in the disclosure, depending on the real-time or near real-time data received, IUI 430 can display text such as "high level of background noise. Please move to a different area that is more quiet." or "low voice volume. Please speak louder." on the screen of mobile device 12, so that user 16 may be notified of possible hindrances to the speech recognition system and take appropriate actions accordingly. In one embodiment, IUI 430 may be able to determine if the background noise is too high, or if the volume is too low for the speech recognition engine 230 to work properly based on audio data from the microphone of mobile device 12.

In one embodiment, the platform manager 240 may be further configured to automatically switch between various speech recognition engines or frameworks, such as OpenEar™ and RapidEar™, in order to get improved speech recognition results. In another embodiment, the platform manager 240 may switch between different speech recognition engines as well, including PocketSphinx.

Exemplary Local Speech Recognition Process (Offline Mode)

A user can first download and install SpeakRead mobile application onto his or her mobile device 12, and can register as an authorized user 16. Once SpeakRead mobile application is launched, the user may select a start button anywhere on the screen of the mobile device 12 to indicate that he or she is ready to speak.

At any given time, user 16 can select "STOP SpeakRead" option or button on the screen of mobile device 12 to indicate that he or she is done with the current speech segment, and that SpeakRead mobile application may start processing the speech segment.

In one embodiment, when user 16 speaks into a microphone of mobile device 12, his or her speech or audio input is received by I/O module 220 of the mobile device 12, typically as an analog wave. The analog wave can then be converted to a digital form by an analog-to-digital converter (ADC) during audio processing. For example, ADC may use digital sampling to convert the analog data into digital data. The analog wave can also be converted to a digital form by any other known method. Speech recognition engine 230 can then process the digital form of the audio input to generate and store recognized text.

In one embodiment, a speech decoder program in the speech recognition engine 230 may decode the audio input into a set of distinct sounds or phonemes, so that the speech recognition engine 230 may search the local acoustic model 270 for a corresponding phoneme for each distinct sound. Next, the speech recognition engine 230 may check the local language model 260 for a set of corresponding text or word.

Once a word is found or recognized by speech recognition engine 230, platform manager 240 or in particular, BLMT 410, may determine a recognition index for the word. As previously mentioned, BLMT 410 can be configured to generate the recognition index based on real-time or near real-time data from user input. Once generated, the recognition index can be stored in a temporary memory cache or a local memory 270, so that if needed it may be sent to server 14 along with its associated word and the corresponding audio input in WAV form. In an offline mode, the transmission of data to server 14 may not be in real-time and would occur likely when the SpeakRead mobile application is switched to an online mode.

If the recognition index is too low, platform manager 240 can determine the reason behind such low index based on a variety of parameters such as background noise, volume, and so on. IUI 430 can be configured to send suitable recommendations via text to user 16 in the event a recognition index is low. As previously described, depending on the real-time or near real-time data received, IUI 430 can display text such as "high level of background noise. Please move to a different area that is more quiet." or "low voice volume. Please speak louder." on the screen of mobile device 12, so that user 16 may be notified of possible hindrances to the speech recognition system and take appropriate actions accordingly.

Meanwhile, CTM 420 may work in the background to identify user 16 based on his or her pattern, accents, tone or other sound characteristic of the audio input. By comparing and possibly matching the sound characteristics of the audio input with a voice signature associated with a user ID of user 16, the system can determine if a person speaking at any given moment is registered user 16 or someone else, such as a new speaker.

The recognized words may then be displayed to user 16 on the screen of mobile device 12. In one embodiment, if platform manager 240 and/or CTM 420 determine that some of the recognized text correspond to speech uttered by someone other than user 16 (i.e., the primary user or the registered account holder), then SpeakRead mobile application may be further configured to display the recognized text in such a way as to distinguish text spoken by user 16 and text spoken by someone else. For example, recognized text determined to be from user 16 may be displayed on the left hand side, while recognized text determined to be from someone else may be displayed on the right hand side of the screen.

Server 14 and Online Model

As previously described, server 14 may be accessible from network 10. In one embodiment, server 14 can comprise a processor 310, a server I/O module 320, a training module 330, a client portal module 340, a storage medium 350, a server language model 360 and a server acoustic model 370. Server language and acoustic models may comprise models for all users 16 of SpeakRead mobile applications and can be configured to leverage and train the aggregated speech input from all mobile devices 12 in order to update and improve the language and acoustic models, as described below.

Training module 330 may be configured to adapt classic training or machine learning techniques such as Bayesian analysis, Hidden Markov Models, Baum Welch algorithm, decision tree and so on, in training data and updating server language and acoustic models 360 and 370.

The server language model 360 may be created from training based on a speech corpus, which can be a database of audio files and corresponding text transcripts. In one embodiment, the server language model 360 may comprise only text. In the same or another embodiment, the server language model 360 may comprise a grammar file containing sets of predefined combinations of words.

In another embodiment, server 14 may optionally comprise a server lexicon database (not shown).

Figure 3:
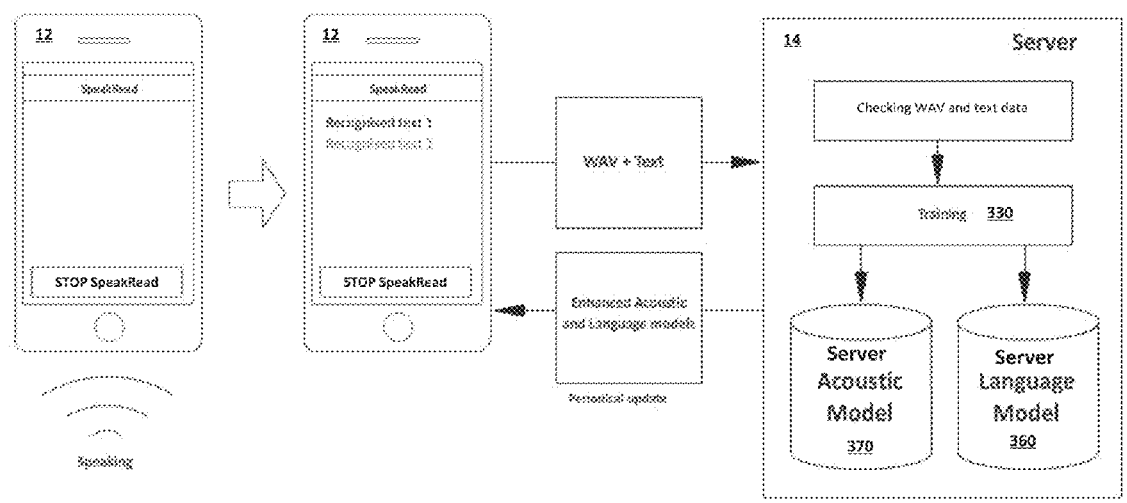
FIG. 3 illustrates an exemplary system diagram according to some embodiments.
Figure 5:
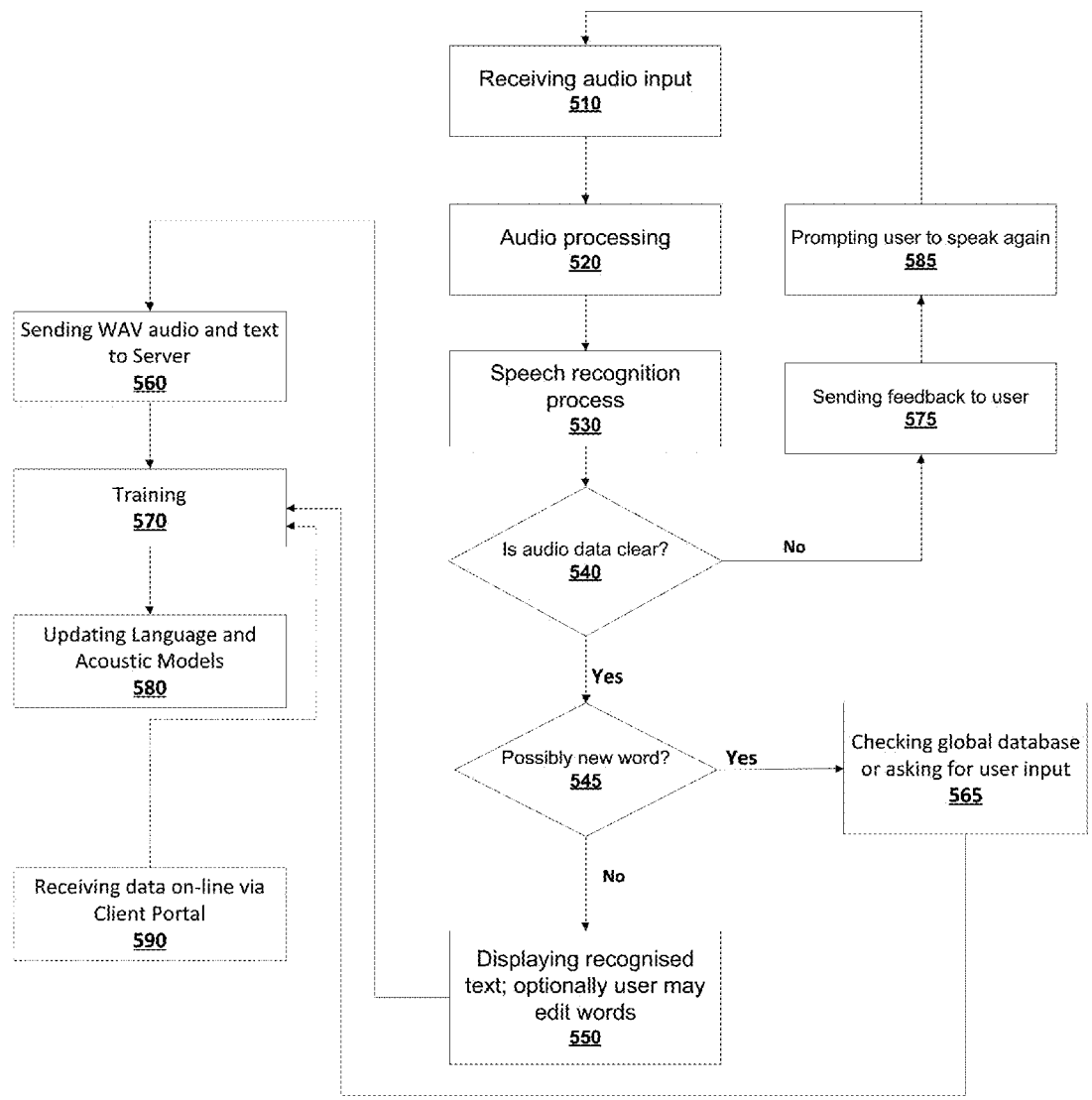
FIG. 5 illustrates an exemplary workflow process according to some embodiments.

Referring now to FIGS. 3 and 5, at step 510, a SpeakRead mobile application installed on mobile device 12 receives audio input from microphone. The audio input is received by I/O module 220 of the mobile device 12, typically as an analog wave.

At step 520, the analog wave can then be converted to a digital form by an analog-to-digital converter (ADC) during audio processing. For example, ADC may use digital sampling to convert the analog data into digital data. The analog wave can also be converted to a digital form by any other known method.

At step 530, speech recognition engine 230 can then process the digital form of the audio input to generate and store recognized text. In one embodiment, a speech decoder program in the speech recognition engine 230 may decode the audio input into a set of distinct sounds or phonemes, so that the speech recognition engine 230 may search the local acoustic model 270 for a corresponding phoneme for each distinct sound. Next, the speech recognition engine 230 may check the local language model 260 for a set of corresponding text. In one embodiment, if no matching text can be located by the local language model 260, the speech recognition engine 230 may determine that the to-be-recognized word in the audio input is new and proceed to steps 545 and 565.

In another embodiment, if no matching text can be located by the local language model 260, SpeakRead mobile application may prompt the user to enter a text, via IUI 430, by typing letters into the keyboard of mobile device 12. Once the user enters a corresponding text, the audio input in WAV form and the corresponding text can be stored and then trained by BLMT, and further updated in the local language and acoustic models 260 and 270. Optionally, the audio input in WAV form and the corresponding text may also be trained by the server training module 330 and further updated in the server language and acoustic models 360 and 370.

At step 540, platform manager 240 or in particular, BLMT 410, may determine if the audio data is clear enough or otherwise of sufficient quality to be processed and recognized. For example, BLMT 410 may attempt to determine a recognition index for the word. As previously mentioned, BLMT 410 can be configured to generate the recognition index based on user input via IUI 430. Once generated, the recognition index can be stored in a temporary memory cache or a local memory 270, so that if needed it may be sent to server 14 along with its associated word and the corresponding audio input in WAV form.

In one embodiment, if the recognition index is too low, at steps 575 and 585, platform manager 240 can determine the reason behind such low index based on a variety of parameters such as background noise, volume, and so on. IUI 430 can be configured to send suitable recommendations via text to user 16 in the event a recognition index is low. Depending on the real-time or near real-time data received, IUI 430 can display text such as "high level of background noise. Please move to a different area that is more quiet." or "low voice volume. Please speak louder." on the screen of mobile device 12, so that user 16 may be notified of possible hindrances to the speech recognition system and take appropriate actions accordingly.

In another embodiment, without checking the recognition index, IUI 430 and BLMT 410 may be able determine if a background noise is too high or a speaking volume is too low and generate user prompts or notifications accordingly.

Meanwhile, CTM 420 may work in the background to identify user 16 based on his or her pattern, accents, tone or other sound characteristic of the audio input. By comparing and possibly matching the sound characteristics of the audio input with a voice signature associated with a user ID of user 16, the system can determine if a person speaking at any given moment is registered user 16 or someone else, such as a new speaker.

At steps 545 and 565, if speech recognition engine 230 determines that audio input likely contains a new word at step 530, as it fails to find any recognized text based on the audio input, the speech recognition engine 230 may contact server 14 or a global vocabulary database 18 via network 10 in order to check for a set of corresponding text. Since the global vocabulary database 18 may comprise a large number of recorded utterances from different speakers with a variety of dialects, accents, and tones, collected from different speech recognition systems all over the world, speech recognition engine 230 may locate at least one word based on the set of phonemes and corresponding text. Once a corresponding text of the new word is found from the global database 18, the audio input in WAV form and the corresponding text can be stored and then trained by BLMT 410, and further updated in the local language and acoustic models 260 and 270. Optionally, the audio input in WAV form and the corresponding text may also be trained by the server training module 330 and further updated in the server language and acoustic models 360 and 370.

Still at steps 545 and 565, if speech recognition engine 230 still cannot find a new word in the global database 18 or the server language and acoustic models, then SpeakRead mobile application may prompt the user to enter a text, via IUI 430, by typing letters into the keyboard of mobile device 12. Once the user enters a corresponding text, the audio input in WAV form and the corresponding text can be stored and then trained by BLMT, and further updated in the local language and acoustic models 260 and 270. Optionally, the audio input in WAV form and the corresponding text may also be trained by the server training module 330 and further updated in the server language and acoustic models 360 and 370.

At step 550, the recognized words or sentence may then be displayed to user 16 on the screen of mobile device 12. In one embodiment, if platform manager 240 and/or CTM 420 determine that some of the recognized text correspond to speech uttered by someone other than user 16 (i.e., the primary user or the registered account holder), then SpeakRead mobile application may be further configured to display the recognized text in such a way as to distinguish text spoken by user 16 and text spoken by someone else. For example, recognized text determined to be from user 16 may be displayed on the left hand side, while recognized text determined to be from someone else may be displayed on the right hand side of the screen.

In one embodiment, after recognised text of a user 16's speech is displayed on the screen of the mobile device 12, the user 16 may indicate to the mobile device 12 that he or she would like to edit the displayed recognized text. The user 16 may indicate such an intention by single or double tapping the screen of the mobile device 12, or he or she may speak to the mobile device 12 (e.g. "incorrect" or "edit sentence").

Once the mobile device 12 receives indication that the user 16 intends to edit the most recently recognized text displayed on the screen, the mobile device 12 via Interface User Interface (IUI) 430 may provide the user 16 with an interface on which the user 16 may enter his desired edits. For example, if the recognized text displayed is "wake me up at 11 am" after the user actually said "wanna meet up at 11 am", the user 16 may choose to edit "wake me" to "wanna meet." Once the user 16 has finished the edits, he or she may hit enter key, and IUI 430 on the mobile device 12 may store and/or send the user input "wanna meet" as well as the replaced text "wake me" to BLMT 410. BLMT 410 may then generate a recognition index based on the user input and the original recognized text. For another example, if a user corrects 1 word out of 10 words in a sentence, the recognition index may be 9 out of 10 or 90%. In another example, if a user corrects all the words in a sentence, the recognition index may be 0%.

At steps 560, 570, and 580, after each word is recognized or received from user, SpeakRead mobile application can be configured to send the audio input WAV segment and the corresponding text to server 14, so that training module 330 may train the server language and acoustic models based on the data sent by mobile application. The server language model 260 and server acoustic model 370 can be constantly improved in this manner, as server 14 collects data in real-time or near real-time from all SpeakRead mobile applications installed on all mobile devices 12.

Periodically or continuously, server 14 may send updated language or acoustic models to each SpeakRead mobile application on each mobile device 12. In turn, the recognition index along with success rate may improve as more users 16 use SpeakRead mobile applications over the long run.

At step 590, client portal module 340 may optionally provide a browser-based, internet-accessible client portal to all registered users 16 and their friends and relatives, who may use the portal to enter their own vocabulary, dialect, jargon, accents, and so on. The input from users 16 and their friends/relatives may be further collected by server 14 and used to train and update the server language and acoustic models 360 and 370.

Training of Language and Acoustic Models on Server 14

As previously described, training module 330 on server 14 may train and update server language model 360 and server acoustic model 270, which in turn send updates to each local language model 260 and acoustic model 270 on each mobile device 12 connected to server 14.

In another embodiment, an Advanced Training Server or ATS (not shown) connected to network 10 may be engaged for training the server language model 360 and server acoustic model 370.

An ATS may have its own processor, I/O module, local memory, speech recognition engine, language model, acoustic model, and/or vocabulary database installed on the server. The ATS may also connect to global vocabulary database 18 via network 10. The ATS can be configured to collect real-time or near real-time training data from a pool of testers located in one or more specific regions or countries, such as in Denmark, United Kingdom or United States. The pool of testers are people that speak one or more languages, or with one or more accents or local dialects. Each of the testers may have a mobile device, in which an Advanced Training (AT) mobile application is installed. Each AT mobile application may be connected to ATS over network 10. The AT mobile application on each mobile device may be configured to store and analyze real-time or near real-time speech or audio data input from the pool of testers.

In one embodiment, the pool of testers may be pre-arranged by an administrator. In another embodiment, the pool of testers may absorb new tester(s) per a specific set of entry rules. In yet another embodiment, the pool of testers may be divided into sub-groups of different language groups, or dialect groups, or age groups and so on.

During operation of the AT mobile application, a tester may speak to a mobile device with an AT mobile application installed via its microphone, and the AT mobile application may be configured to collect the speech or audio data, and may prompt the tester to input appropriate corresponding text for the speech or audio data. For example, the user may speak a word "/rɛstərɒnt /" and enter a corresponding text "restaurant". The AT mobile application may then collect the audio data with the corresponding text and send them to ATS server. ATS server may be configured to train and update the server language model 360 and acoustic language model 370 based on the audio data and the corresponding text received from each AT mobile application.

In another embodiment, once an AT mobile application has received audio data from a tester, it may attempt to recognize an utterance in the audio data via its speech recognition engine and the internal or local language and acoustic models. Once recognized, the AT mobile application may display the recognized text, and ask the tester to indicate if the recognized text is right or wrong. The tester may correct the text via a custom user interface if he or she deems the recognized text inaccurate. The AT mobile application may then collect the audio data with the corresponding text and send them to ATS server. ATS server may be configured to train and update the server language model 360 and acoustic language model 370 based on the audio data and the corresponding text received from each AT mobile application.

In one embodiment, the ATS and AT mobile applications are only used to set up the initial server language model 360, server acoustic model 370 and optionally the global vocabulary database 18.

In another embodiment, the AT mobile applications and ATS may continuously update the server language model 360, server acoustic model 370 and optionally the global vocabulary database 18.

Example Embodiment—Mobile Device to VoIP Telephony Device

In an aspect, embodiments described herein provide a system for speech recognition for a hearing impaired user on a mobile device in communication a telephony device over a VoIP telecommunications system.

FIG. 7 shows an example system 700 with a hearing assistance processor 706 configured for real-time data exchange with a hearing assistance application 708, at least one voice processor 704 and at least one recognition processor 710. The recognition processor 710 implements one or more speech recognition engines as described herein. The hearing assistance application 708 may be the SpeakRead application described herein.

In accordance with embodiments, operation of the system 700 does not require specific configuration of the telephony device for providing the speech recognition to the user of the mobile device. Hearing assistance users or otherwise may not able to hear voice, speech or audio data received at telephony device 702. The hearing assistance processor 706 intercepts audio data between a VoIP connection between users using mobile device and telephony device 702. A user has installed the SpeakRead application (e.g. hearing assistance application 708) on their mobile device connected to telephony device 702.

The hearing assistance application 708 enables a user of mobile device to call to telephony device 702 through a hearing assistance processor 706 to trigger text/speech recognition using at least one recognition processor 710. The call connection may involve one or multiple voice processors 704.

The hearing assistance processor 706 provides for real-time recognition services to the hearing assistance application 708 and continuously converts audio data into text data using improved techniques described herein. Some recognition systems may record an entire audio session before transmitting audio data, and then transmits the audio data as a recorded session. Embodiments described herein provide a system 700 that provides continuous real time or near real time conversion. For example, a hearing assistance processor 706 may be configured with middleware that starts to transmit audio data as a stream or smaller chunks once detected in real-time to avoid delays of recording the conversation or session first. Further, the telephony device 702 does not require particular configuration or installation of an application which may increase usage as only need adoption by one user (e.g. user of mobile device with hearing assistance application 708). A user of telephony device may make a normal voice call using a phone number, username, or other connection identifier associated with the user of mobile device with hearing assistance application 708, and the user may answer the voice call using the hearing assistance application 708.

The hearing assistance processor 706 detects the speech or audio data from telephony device and triggers the text recognition process so that recognition text messages may be transmitted to the hearing assistance application 708 in real time or near real time. The hearing assistance processor 706 may provide a subscription service to user of hearing assistance application 708 in some example embodiments.

The system 700 may not require both users to download and install an application (e.g. hearing assistance application 708) to their device. In some examples, both devices may install the application. The system 700 may provide improved recognition accuracy using the recognition index described to improve speech recognition for audio/text conversion. The hearing assistance processor 706 may receive the metadata or parameters regarding the background, noise level, audio level, and so on, and prompt with recommendations and feedback requests. Example metadata about the environment or context of the audio data includes background noise, accent, volume, speed of speech, clarity, and so on. The hearing assistance processor 706 may switch to different recognition platforms to get a better recognition index value and improve recognition. The hearing assistance processor 706 may switch voice processors 704 to get a better recognition index value and improve recognition. For example, one voice processor 704 may provide better quality audio data. The hearing assistance processor 706 may recognize user to improve accuracy, as described herein.

The voice processor 704 receives audio data from a telephony device 702 for transmission to the mobile device with the hearing assistance application 708. Either the telephony device 702 or the hearing assistance application 708 may initiate the voice/text connection between devices. The hearing assistance processor 706 continuously receive or intercept in real-time or near real-time the audio data from the voice processor 704 and continuously transmits the audio data in real-time or near real-time to the at least one recognition processor 710 to convert the audio data into corresponding text data. The hearing assistance processor 706 continuously receives the text data from the recognition processor 710 and transmits the text data to the hearing assistance application 708 in real-time or near real-time. The continuous and real-time processing may facilitate flow of conversation and usage of application by users.

As shown, a hearing assistance application 708 (e.g. SpeakRead application) is installed on a mobile device having a display screen (e.g. mobile device 12 of FIG. 1). The hearing assistance application 708 is configured to continuously receive the text data and display at least a portion of the text data on the display screen of the mobile device in real-time or near real-time. The text data may be from audio received directly from user of mobile device or from audio data received from telephony device 702 depending on mode of operation.

In some embodiments, the hearing assistance application 708 is configured to receive additional audio data for transmission to the telephony device and transmit the additional audio data to the hearing assistance processor. The additional data may be from audio received directly from user of mobile device or from audio data received from telephony device 702 depending on mode of operation. In some examples, if the audio data is received at the hearing assistance processor 708, then the hearing assistance application 708 is configured to transmit the additional audio data to the telephony device 702 via the at least one voice processor 704.

In some embodiments, the hearing assistance processor 706 is configured to process the audio data by querying a local language model and a local acoustic model as described herein. The local language model and a local acoustic model may improve recognition and may be used to identify users associated with audio data, for example. In some embodiments, the hearing assistance processor 706 is configured to train the local language model and the local acoustic model based on data from the global database or user input. Further details on training is described herein.

In some embodiments, the hearing assistance processor 706 is configured to determine if the audio data is clear or otherwise of sufficient quality to be processed by the at least one recognition processor. This may use the recognition index for example, or other evaluations of quality or accuracy of recognition. Upon determining that the audio data is not clear or of insufficient quality to be processed, the hearing assistance processor 706 may send feedback or recommendations to the telephony device or mobile device and prompting for improved audio data.

In some embodiments, the hearing assistance processor 706 is configured to determine, for the audio data, a recognition index as an estimation or indicia of accuracy. Further details regarding the recognition index are described herein. The recognition index may be a metric based on various factors including characteristics of the audio data (e.g. clarity, speed, accent, language, volume), other metadata or parameters about the environment, context (e.g. type of language, words or vocabulary) or background (e.g. background noise), user input and responses to prompts (e.g. validation of text data, historical usage data, correction of text data), and so on. The recognition index may be compared to a threshold value indicating a minimum level of acceptance for accuracy. If the recognition index is below the threshold value then the hearing assistance processor 706 is configured to determine one or more reasons or factors contributing to the low value for the recognition index and identify one or more recommendations to attempt to improve the accuracy. A feedback notification may be generated based on the one or more recommendations identified. The validation or correction of text from the user may be received in response to displaying the text data generated using the audio data on the display of mobile device.

As noted, the hearing assistance processor 706 may attempt to improve accuracy and the recognition index by detecting or identifying a user associated with the audio data. The hearing assistance processor 706 may have a training data set particular to the user based on historical usage, for example. In some examples, the hearing assistance processor 706 may switch recognition engines (e.g. recognition processor 710 or engines residing thereon) and recognition frameworks, such as by connecting to at least one other recognition processor in attempt to improve the recognition index or accuracy. In some embodiments, the hearing assistance processor 706 is configured to switch to at least one other voice processor 704 in attempt to improve the recognition index. Different voice processor 704 may provide different levels of quality for audio data which may impact accuracy of recognition. In some examples, the hearing assistance processor 706 may try different language and global vocabularies to improve accuracy. Other examples are described herein.

In some embodiments, the hearing assistance processor 706 is configured to derive metadata or parameters for the audio data and determine, for the audio data, a recognition index as an estimation of accuracy using the metadata or the parameters. Example metadata are described relating to the aspects or characteristics of the audio data, background factors, vocabulary, language, volume, tone, clarity, speed of speech, accent, past user, historical data, and so on. Other examples are described herein.

In some embodiments, the hearing assistance processor 706 is configured to identify a user providing the audio data and transmit the identity of the user to at least one recognition processor to improve accuracy of recognition. Historical data may be used to train and improve system, including historical data from the same user. As described, the hearing assistance processor 706 may manage speech signatures used to identify users. Other techniques may be used to identify users such as login identifiers, code or serial number associated with the mobile device or hearing assistance application 708, caller identifier from telephony device 702, user name or identifier from the voice processor 704, and so on.

In some embodiments, the hearing assistance application 708 is configured to receive additional audio data and transmit the additional audio data to the hearing assistance processor 706. The hearing assistance application 708 enables two-way conversation between the user of the mobile device (with the hearing assistance application 708 installed) and the user of the telephony device 702. The additional audio data may be received at the mobile device (with the hearing assistance application 708 installed) or the telephony device 702.

The hearing assistance processor 706 is configured to transmit the additional audio data to the at least one recognition processor 710 to convert the additional audio data into corresponding additional text data, receive the additional text data from the at least one recognition processor, and transmit the additional text data to the hearing assistance application 708. The hearing assistance application 708 is configured to display at least a portion of the additional text data on the display screen of the mobile device for review, validation or correction by user. The hearing assistance application 708 is configured to receive confirmation to transmit the additional audio data or the text data to the telephony device, and transmit the confirmation to the hearing assistance processor 710. The hearing assistance application 708 is configured to receive one or more corrections to the displayed text data and transmits the corrections to the hearing assistance processor 710 for processing. The corrections and validation may be used to adjust or impact the recognition index of the audio data, as described herein.

If the additional audio data was initially received at the mobile device (with the hearing assistance application 708 installed) then the hearing assistance processor 706 is configured to, in response to receiving the confirmation, validation or correction, transmit the additional audio data or the text data or further additional audio data derived from at least a portion of the text data (including corrections thereto) to the telephony device 702 via the at least one voice processor 704. As noted, multiple voice processors 704 may connect to hearing assistance processor 706 to provide different options for transmission and receipt of audio and text data to and from the telephony device 702. The telephony device 702 may be a device configured to receive speech signals or utterances from an input device (e.g. microphone) and generate audio data output based on the received speech signals.

In some embodiments, the hearing assistance processor 706 is configured to derive metadata or parameters for the additional audio data and determine, for the additional audio data, a recognition index as an estimation of accuracy using the metadata or the parameters. Example details regarding the recognition index is described herein. In some embodiments, the hearing assistance processor 706 is configured to compare the recognition index to a threshold and transmit a feedback notification to the hearing assistance application for display on the display screen of the mobile device. The feedback notification may include one or more recommendations for improving accuracy. Example recommendations include speaking louder, speaking slower, moving to a new area to attempt to reduce background noise, providing an indication of language, providing user identification, and so on. Further examples are described herein.

In another aspect, the system 700 may have a hearing assistance application 708 on a mobile device and a hearing assistance processor 706 configured to receive audio data from the hearing assistance application 708 and transmit the audio data to the recognition processor 710 to convert the audio data into corresponding text data. The hearing assistance processor 706 receives the text data from the recognition processor 710 and transmits the text data to the hearing assistance application 708. The hearing assistance application 708 is configured to display at least a portion of the text data on the display screen of the mobile device and receive confirmation to transmit the audio data, the text data or additional audio data derived from the text data to the telephony device 702. The display of text data enables a user to review the submitted audio data and recognition thereof prior to sending to the telephony device 702. The additional audio data may be computer generated audio based on the text data with modifications to certain aspects, such as volume, speed, accent, and so on. The hearing assistance application 708 transmits the confirmation to the hearing assistance processor 706. The hearing assistance processor 706 is configured to, in response to receiving the confirmation, transmit the audio data, the text data, or the additional audio data derived from the text data to the telephony device 702 via the at least one voice processor 704. The telephony device 702 may be configured with an audio output device, text output device or a combination thereof.

The hearing assistance application 708 is configured to receive additional audio data for transmission to the telephony device 702 and transmit the additional audio data to the hearing assistance processor. The hearing assistance processor 706 is configured to transmit, to the hearing assistance application 708, additional text data corresponding to the additional audio data for confirmation that the audio data and/or recognition thereof is accurate and may be transmitted to the telephony device 702. In response to receiving an additional confirmation, the hearing assistance processor 706 is configured to transmit the additional audio data to the telephony device 702 via the at least one voice processor 704. Upon receipt of audio data the hearing assistance processor 706 may generate a recognition index as described herein.

The hearing assistance processor 706 is also configured to process the audio data by querying a local language model and a local acoustic model as described herein. In some embodiments, the hearing assistance processor is configured to train the local language model and the local acoustic model based on data from the global database or user input.

In some embodiments, the hearing assistance processor 706 is configured to interact with the at least one recognition processor 710 to determine if the audio data is clear or otherwise of sufficient quality to be processed by the at least one recognition processor 706, and upon determining that the audio data is not clear or of insufficient quality to be processed, sending feedback to the hearing assistance application 708 and prompting for improved audio data.

In some embodiments, the hearing assistance processor 706 is configured to determine, for the audio data, a recognition index as an estimation of accuracy and switch to connect to at least one other recognition processor 710 or at least one other voice processor 704 in attempt to improve the recognition index. In some embodiments, the hearing assistance processor is configured to identify a user providing the audio data and transmit the identity of the user to the at least one recognition processor 710 to improve accuracy of recognition.

In another aspect, there is provided a method of providing speech recognition to a hearing impaired user on a mobile device. The method may involve continuously receiving, at a hearing assistance processor 706 in real time or near real time, audio data from a hearing assistance application. The hearing assistance processor 706 is configured to continuously transform the audio data, by speech recognition processing in real time or near real time, into corresponding text data. The process may involve querying a local language model, a local acoustic model, and other recognition techniques described herein. The hearing assistance processor 706 is configured to receive metadata and parameters about the environment and background of the audio data to determine a recognition index and modify the continuous transformation of the audio data into corresponding text data based on the recognition index. The hearing assistance processor 706 is configured to continuously transmit the text data to the hearing assistance application 708 in real time or near real time for display of at least a portion of the one or more corresponding text on a screen of the mobile device.

The functionality described herein may also be accessed as an Internet service, for example by accessing the functions or features described from any manner of computer device, by the computer device accessing a server computer, a server farm or cloud service configured to implement said functions or features.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. A processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including an EGM, A Web TV, a Personal Digital Assistant (PDA), a smart phone, a tablet or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, a computer may receive input information through speech recognition or in other audible formats.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The systems and methods may be embodied as a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments discussed above. The computer readable medium or media can be transportable, such that the program or programs stored thereon can be loaded onto one or more different computers or other processors to implement various aspects as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of embodiments described herein. Additionally, it should be appreciated that according to one aspect of this embodiment, one or more computer programs that when executed perform methods as described herein need not reside on a single computer or processor, but may be distributed in a modular fashion amongst a number of different computers or processors to implement various aspects.

Computer-executable instructions may be in many forms, such as program modules, executed by one or more computers or other devices. Generally, program modules include routines, programs, objects, components, data structures, etc, that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Depending on the particular implementation and various associated factors such as the resources of the communications device, wireless network parameters, and other factors, different implementation architectures may be used for embodiments described herein.

It should also be understood that the computer server may be implemented as one or more servers in any possible server architecture or configuration including for example in a distributed server architecture, a server farm, or a cloud based computing environment.

Wherever the system is described as receiving input from the user of the communications device, it is to be understood that the input may be received through activation of a physical key on the communications device, through interaction with a touch screen display of the communications device, through a voice command received at the communications device and processed by the system, through a user gesture observed and processed at the communications device, through physically moving the communications device in a predetermined gesture pattern including shaking the communications device, through receiving data from another local or remote communications device associated with the user, or through any other sensory interaction with the communications device or otherwise controlling the communications device.

The present systems and methods may be practiced in various embodiments. A suitably configured computer device, and associated communications networks, devices, software and firmware may provide a platform for enabling one or more embodiments as described above. By way of example, FIG. 6 shows an example computer device 200 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. Computer device 200 may further include a graphics processing unit (GPU) 122 which is operatively connected to CPU 102 and to memory 106 to offload intensive image processing calculations from CPU 102 and run these calculations in parallel with CPU 102. An operator 107 may interact with the computer device 100 using a video display 108 connected by a video interface 105, and various input/output devices such as a keyboard 115, mouse 112, and disk drive or solid state drive 114 connected by an I/O interface 109. In known manner, the mouse 112 may be configured to control movement of a cursor in the video display 108, and to operate various graphical user interface (GUI) controls appearing in the video display 108 with a mouse button. The disk drive or solid state drive 114 may be configured to accept computer readable media 116. The computer device 200 may form part of a network via a network interface 111, allowing the computer device 200 to communicate with other suitably configured data processing systems (not shown). One or more different types of sensors 135 may be used to receive input from various sources. The example computer device 200 may be used to implement a mobile device in some examples, or a server or processor in other examples.

The present systems and methods may be practiced on virtually any manner of computer device including a desktop computer, laptop computer, tablet computer or wireless handheld. The present systems and methods may also be implemented as a computer-readable/useable medium that includes computer program code to enable one or more computer devices to implement each of the various process steps in a method in accordance with embodiments described herein. In case of more than computer devices performing the entire operation, the computer devices are networked to distribute the various steps of the operation. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

The mobile application of embodiments described herein may be implemented as a web service, where the mobile device includes a link for accessing the web service, rather than a native application.

The embodiments described herein involve computing devices, servers, receivers, transmitters, processors, memory, display, networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

Substituting the computing devices, servers, receivers, transmitters, processors, memory, display, networks particularly configured to implement various acts for non-physical hardware, using mental steps for example, may substantially affect the way the embodiments work.

Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

While illustrated in the block diagrams as groups of discrete components communicating with each other via distinct electrical data signal connections, the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching example embodiments.

It will be appreciated by those skilled in the art that other variations of the embodiments described herein may also be practiced and other modifications are therefore possible.

In further aspects, the disclosure provides systems, devices, methods, and computer programming products, including non-transient machine-readable instruction sets, for use in implementing such methods and enabling the functionality described previously.

Although the disclosure has been described and illustrated in exemplary forms with a certain degree of particularity, it is noted that the description and illustrations have been made by way of example only. Numerous changes in the details of construction and combination and arrangement of parts and steps may be made.

Except to the extent explicitly stated or inherent within the processes described, including any optional steps or components thereof, no required order, sequence, or combination is intended or implied. With respect to both processes and any systems, devices, etc., described herein, a wide range of variations is possible in various circumstances.

We claim:

1. A system of providing speech recognition to a user on a mobile device, the system comprising:
    a hearing assistance processor configured for real-time data exchange with a hearing assistance application, at least one voice processor and at least one recognition processor, the at least one voice processor configured to receive audio data from a telephony device for transmission to the mobile device, the hearing assistance processor configured to continuously receive or intercept in real-time or near real-time the audio data from the voice processor and continuously transmit the audio data in real-time or near real-time to the at least one recognition processor to convert the audio data into corresponding text data, the hearing assistance processor configured to continuously receive the text data from the recognition processor and transmit the text data to the hearing assistance application in real-time or near real-time, wherein the hearing assistance processor is configured to interact with the at least one recognition processor to determine if the audio data is clear or otherwise of sufficient quality to be processed by the at least one recognition processor, and upon determining that the audio data is not clear or of insufficient quality to be processed, sending audio feedback to the telephony device that prompts for improved audio data; and
    a hearing assistance application on a mobile device having a display screen, the hearing assistance application configured to continuously receive the text data and display at least a portion of the text data on the display screen of the mobile device in real-time or near real-time;
    whereby operation of the system does not require specific configuration of the telephony device for providing the speech recognition to the user of the mobile device;
    the hearing assistance application being configured to receive additional audio data from the user of the mobile device and transmit the additional audio data to the hearing assistance processor;
    the hearing assistance processor being configured to transmit the additional audio data to the at least one recognition processor to convert the additional audio data into corresponding additional text data, receive the additional text data from the at least one recognition processor, and transmit the additional text data to the hearing assistance application;
    the hearing assistance application being configured to display at least a portion of the additional text data on the display screen of the mobile device and receive confirmation to transmit the additional audio data or the text data to the telephony device, and transmit the confirmation to the hearing assistance processor; and
    the hearing assistance processor being configured to, in response to receiving the confirmation, transmit the additional audio data, the text data or generated audio data corresponding to the text data to the telephony device via the at least one voice processor.

2. The system of claim 1, wherein:
the hearing assistance application is configured to receive additional audio data for transmission to the telephony device and transmit the additional audio data to the hearing assistance processor; and
the hearing assistance processor configured to transmit the additional audio data to the telephony device via the at least one voice processor.

3. The system of claim 1, wherein the hearing assistance processor is configured to process the audio data by querying a local language model and a local acoustic model.

4. The system of claim 3, wherein the hearing assistance processor is configured to train the local language model and the local acoustic model based on data from the global database, the global database including multi-language, multi-dialect and multi-jargon voice-text words.

5. The system of claim 1, wherein the hearing assistance processor is configured to determine, for the audio data, a recognition index as an estimation of accuracy and switch to connect to at least one other recognition processor in attempt to improve the recognition index.

6. The system of claim 5, wherein the hearing assistance processor is configured to derive metadata or parameters for the audio data and determine, for the audio data, a recognition index as an estimation of accuracy using the metadata or the parameters.

7. The system of claim 1, wherein the hearing assistance processor is configured to determine, for the audio data, a recognition index as an estimation of accuracy and switch to at least one other voice processor in attempt to improve the recognition index.

8. The system of claim 1, wherein the hearing assistance processor is configured to identify a user providing the audio data and transmit the identity of the user to the at least one recognition processor to improve accuracy of recognition.

9. The system of claim 1, wherein the hearing assistance processor is configured to derive metadata or parameters for the audio data and determine, for the audio data, a recognition index as an estimation of accuracy using the metadata or the parameters.

10. The system of claim 9, wherein the hearing assistance processor is configured to compare the recognition index to a threshold and transmit a feedback notification to the hearing assistance application for display on the display screen of the mobile device.

11. The system of claim 1 further comprising receiving a correction or edit to the additional text data on the display screen prior to receiving the confirmation.

12. The system of claim 1, upon determining that the audio data is not clear or of insufficient quality to be processed, the at least one recognition processor configured to not convert the audio data into corresponding text data and wait for the improved audio data.

13. A system of providing speech recognition to a user on a mobile device, the system comprising:
a hearing assistance application on a mobile device, the mobile device having a display screen, the hearing assistance application configured to receive audio data and transmit the audio data;
a hearing assistance processor configured for real-time data exchange with the hearing assistance application, at least one voice processor and at least one recognition processor, the hearing assistance processor configured to receive the audio data from the hearing assistance application and transmit the audio data to the at least one recognition processor to convert the audio data into corresponding text data, receive the text data from the at least one recognition processor, and transmit the text data to the hearing assistance application;
the hearing assistance application configured to display at least a portion of the text data on the display screen of the mobile device and receive confirmation to transmit the audio data, the text data or additional audio data derived from the text data to the telephony device, and transmit the confirmation to the hearing assistance processor; and
the hearing assistance processor is configured to, in response to receiving the confirmation, transmit the audio data, the text data, or the additional audio data derived from the text data to the telephony device via the at least one voice processor,
the hearing assistance processor is configured to receive additional audio data from the telephony device and interact with the at least one recognition processor to determine if the additional audio data is clear or otherwise of sufficient quality to be processed by the at least one recognition processor, and upon determining that the additional audio data is not clear or of insufficient quality to be processed, sending audio feedback to the telephony device that prompts for improved audio data;
the hearing assistance application being configured to receive additional audio data from the user of the mobile device and transmit the additional audio data to the hearing assistance processor;
the hearing assistance processor being configured to transmit the additional audio data to the at least one recognition processor to convert the additional audio data into corresponding additional text data, receive the additional text data from the at least one recognition processor, and transmit the additional text data to the hearing assistance application;
the hearing assistance application being configured to display at least a portion of the additional text data on the display screen of the mobile device and receive confirmation to transmit the additional audio data or the text data to the telephony device, and transmit the confirmation to the hearing assistance processor; and
the hearing assistance processor being configured to, in response to receiving the confirmation, transmit the additional audio data, the text data or generated audio data corresponding to the text data to the telephony device via the at least one voice processor.

14. The system of claim 13, wherein:
the hearing assistance application is configured to receive additional audio data for transmission to the telephony device and transmit the additional audio data to the hearing assistance processor; and
the hearing assistance processor configured to transmit, to the hearing assistance application, additional text data corresponding to the additional audio data, and in response to receiving an additional confirmation, transmit the additional audio data to the telephony device via the at least one voice processor.

15. The system of claim 13, wherein the hearing assistance processor is configured to process the audio data by querying a local language model and a local acoustic model.

16. The system of claim 15, wherein the hearing assistance processor is configured to train the local language model and the local acoustic model based on data from the global database or user input.

17. The system of claim 13, wherein the hearing assistance processor is configured to determine, for the audio data, a recognition index as an estimation of accuracy and switch to connect to at least one other recognition processor or at least one other voice processor in attempt to improve the recognition index.

18. The system of claim 13, wherein the hearing assistance processor is configured to identify a user providing the audio data and transmit the identity of the user to the at least one recognition processor to improve accuracy of recognition.

19. The system of claim 13, upon determining that the audio data is not clear or of insufficient quality to be processed, the at least one recognition processor configured to not convert the audio data into corresponding text data and wait for the improved audio data.

20. A method of providing speech recognition to a user on a mobile device, the method comprising:
- continuously receiving, at a hearing assistance processor in real time or near real time, audio data from a hearing assistance application;
- determining if the audio data is clear or otherwise of sufficient quality to be processed by the at least one recognition processor, and upon determining that the audio data is not clear or of insufficient quality to be processed, sending audio feedback to the telephony device that prompts for improved audio data;
- continuously transforming the audio data, by a speech recognition processing in real time or near real time, into corresponding text data, wherein the processing comprises querying a local language model and a local acoustic model;
- receiving metadata and parameters about the environment and background of the audio data to determine a recognition index, modifying the continuous transformation of the audio data into corresponding text data based on the recognition index; and
- continuously transmitting the text data to the hearing assistance application in real time or near real time for display of at least a portion of the one or more corresponding text on a screen of the mobile devicei receiving additional audio data at the hearing assistance application from the user of the mobile device;
- transmitting the additional audio data to the hearing assistance processor;
- transmitting the additional audio data to the at least one recognition processor to convert the additional audio data into corresponding additional text data;
- receiving the additional text data from the at least one recognition processor;
- transmitting the additional text data to the hearing assistance application;
- displaying at least a portion of the additional text data on the display screen of the mobile device and receive confirmation to transmit the additional audio data or the text data to the telephony device, and transmit the confirmation to the hearing assistance processor; and
- in response to receiving the confirmation, transmitting the additional audio data, the text data or generated audio data corresponding to the text data to the telephony device via the at least one voice processor.

\* \* \* \* \*